United States Patent
Kang et al.

(10) Patent No.: US 8,928,723 B2
(45) Date of Patent: Jan. 6, 2015

(54) MOBILE TERMINAL AND CONTROL METHOD THEREOF

(71) Applicant: LG Electronics Inc., Seoul (KR)

(72) Inventors: Hyunho Kang, Yongin (KR); Jinhee Lee, Uiwang (KR); Areum Park, Seoul (KR); Hanbee Kim, Seoul (KR); Younga Kim, Goyang (KR); Taeryung Rhee, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 13/713,485

(22) Filed: Dec. 13, 2012

(65) Prior Publication Data

US 2013/0250034 A1 Sep. 26, 2013

(30) Foreign Application Priority Data

Mar. 21, 2012 (KR) ........................ 10-2012-0028918

(51) Int. Cl.
| | |
|---|---|
| *H04W 4/02* | (2009.01) |
| *G06F 3/01* | (2006.01) |
| *H04M 1/725* | (2006.01) |
| *H04N 21/442* | (2011.01) |
| *G06F 1/32* | (2006.01) |
| *H04N 7/14* | (2006.01) |

(52) U.S. Cl.
CPC ................ *H04W 4/02* (2013.01); *G06F 3/011* (2013.01); *G06F 3/012* (2013.01); *G06F 3/017* (2013.01); *H04M 1/72569* (2013.01); *H04N 21/44218* (2013.01); *G06F 1/3231* (2013.01); *H04N 7/144* (2013.01); *H04M 2250/12* (2013.01); *H04M 2250/52* (2013.01); *H04N 2007/145* (2013.01)

USPC .......... 348/14.02; 342/464; 345/204; 348/46; 358/1.13; 379/201.1; 379/388.01; 379/424; 455/456.1; 455/550.1; 455/556.1; 455/567; 715/716; 715/848

(58) Field of Classification Search
CPC ... H04W 28/16; H04M 65/1016; H04L 63/08
USPC .................. 342/464; 345/204; 348/14.02, 46; 379/201.1, 388.01, 424; 455/456.1, 455/550.1, 556.1, 567; 715/716, 848
See application file for complete search history.

(56) References Cited

U.S. PATENT DOCUMENTS 5,712,911 A * 1/1998 Her ......................... 379/388.01
6,310,955 B1 * 10/2001 Reeves ........................ 379/424

(Continued)

FOREIGN PATENT DOCUMENTS

| CN | 101625716 | 1/2010 |
| CN | 101867631 | 10/2010 |

(Continued)

OTHER PUBLICATIONS

European Patent Office Application Serial No. 12007308.5, Extended Search Report dated Jul. 25, 2013, 6 pages.

(Continued)

*Primary Examiner* — Gerald Gauthier

(74) *Attorney, Agent, or Firm* — Lee, Hong, Degerman, Kang & Waimey

(57) ABSTRACT

A mobile terminal capable of recognizing at least one of the presence or absence of a user and a location of the user are provided. The mobile terminal includes: a terminal main body; a user tracking unit configured to recognize at least one of the presence or absence of a user and a location of the user within a certain range based on the terminal main body; and a controller configured to generate a control signal for controlling a function of the terminal based on at least one of the presence or absence of the user or the user location.

19 Claims, 15 Drawing Sheets

(56) References Cited

U.S. PATENT DOCUMENTS

| | | | |
|---|---|---|---|
| 7,042,391 B2* | 5/2006 | Meunier et al. | 342/464 |
| 7,120,238 B1* | 10/2006 | Bednarz et al. | 379/201.1 |
| 7,403,194 B2* | 7/2008 | Gu | 345/204 |
| 7,716,606 B2* | 5/2010 | Rekimoto | 715/848 |
| 7,853,291 B2* | 12/2010 | Choi | 455/556.1 |
| 8,676,273 B1* | 3/2014 | Fujisaki | 455/567 |
| 8,705,053 B2* | 4/2014 | Ito et al. | 358/1.13 |
| 2003/0224805 A1* | 12/2003 | Suenaga | 455/456.1 |
| 2006/0223547 A1* | 10/2006 | Chin et al. | 455/456.1 |
| 2008/0006762 A1 | 1/2008 | Fadell et al. | |
| 2009/0219224 A1 | 9/2009 | Elg | |
| 2010/0125816 A1 | 5/2010 | Bezos | |
| 2011/0053636 A1* | 3/2011 | Park | 455/550.1 |
| 2012/0038675 A1 | 2/2012 | Johnson et al. | |
| 2012/0162372 A1* | 6/2012 | Ghyme | 348/46 |
| 2013/0250034 A1* | 9/2013 | Kang et al. | 348/14.02 |
| 2014/0136977 A1* | 5/2014 | Arun et al. | 715/716 |

FOREIGN PATENT DOCUMENTS

| | | |
|---|---|---|
| CN | 101995884 | 3/2011 |
| CN | 102239460 | 11/2011 |
| CN | 102340649 | 2/2012 |
| EP | 2214079 | 8/2010 |

OTHER PUBLICATIONS

The State Intellectual Property Office of the People's Republic of China Application Serial No. 201210533499.3, Office Action dated Aug. 22, 2014, 14 pages.

* cited by examiner

AUTO-SCROLLING PERFORMED

⇩ AUTO-SCROLLING NOT PERFORMED

MOBILE TERMINAL AND CONTROL METHOD THEREOF

CROSS REFERENCE TO RELATED APPLICATIONS

Pursuant to 35 U.S.C. §119(a), this application claims the benefit of earlier filing date and right of priority to Korean Patent Application No. 10-2012-0028918, filed on Mar. 21, 2012, the contents of which are hereby incorporated by reference herein in its entirety.

BACKGROUND

1. Field of the Invention

The example embodiments of the present invention relate to a mobile terminal and, more particularly, to a mobile terminal capable of recognize at least one of the presence or absence of a user and a location of the user.

2. Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

Owing to such improvements, terminals may display contents on a display unit. However, when the user is located outside of a certain range based on the terminal main body, he or she has difficulty in viewing contents displayed on the display unit. Also, when a different user is located within the certain range based on the terminal main body, the different user may be able to view contents displayed on the display unit, so the user privacy may be invaded.

SUMMARY

Accordingly, an object of the example embodiments of the present invention is to provide a mobile terminal capable of enhancing user convenience in displaying contents, and a control method thereof.

To achieve these and other advantages and in accordance with the purpose of the example embodiments of the present invention, as embodied and broadly described herein, the example embodiments of the present invention provide in one aspect a mobile terminal including: a terminal main body; a user tracking unit configured to recognize at least one of the presence or absence of a user and a location of the user within a certain range based on the terminal main body; and a controller configured to generate a control signal for controlling a function of the terminal based on at least one of the presence or absence of the user or the user location.

In an embodiment, the user tracking unit may recognize at least one of the presence or absence of a user and a location of the user by using at least one of a camera, a microphone, and an infrared sensor.

In an embodiment, the controller may control at least one of screen information displayed on a display unit and a volume of a voice output to an audio output unit based on at least one of the presence or absence of a user and a location of the user.

In an embodiment, the controller may control at least one of a size of contents, an interval between contents, and an alignment scheme of contents displayed on the display unit based on at least one of the presence or absence of a user and a location of the user.

In an embodiment, the user tracking unit may track a field of vision of the user within a certain viewing range based on the display unit, and when the field of vision of the user is fixed to the display unit, the controller may auto-scroll screen information displayed on the display unit.

In an embodiment, the controller may determine whether to activate the display unit based on at least one of the presence or absence of a user and a location of the user.

In an embodiment, when the user is not recognized or the user is recognized to be located outside of a certain range based on the main body, the controller may deactivate the display unit, and when an event occurs or the user is recognized to be located within a certain range based on the main body, the controller may activate the display unit.

In an embodiment, the controller may select any one of a video call mode and a voice call mode based on at least one of the presence or absence of the user and the location of the user.

In an embodiment, when the user is not recognized during video call communication or when the user is recognized to be outside of a certain range based on the main body, the controller may transmit a substitute image to a counterpart or convert the mobile terminal to a voice call mode.

In an embodiment, in a state in which screen information is displayed on the display unit, when a different user is recognized through the user tracking unit, the controller may display different screen information on the display unit.

In an embodiment, the controller may determine the different screen information displayed on the display unit based on at least one of the location of the user and information regarding the different user stored in the memory.

In an embodiment, when the user movement is sensed through the user tracking unit, the controller may generate a control signal for controlling a function of the terminal based on the sensed movement.

In an embodiment, the mobile terminal may further include a microphone for receiving a voice signal of the user, and the controller may generate a control signal for controlling a function of the terminal based on the received voice signal.

In an embodiment, in order to control a direction in which the display unit faces, the controller may transmit a control signal according to the location of the user to an external device adjacent to the main body.

To achieve these and other advantages and in accordance with the purpose of the example embodiments of the present invention, as embodied and broadly described herein, the example embodiments of the present invention provide in another aspect a control method of a mobile terminal including a terminal main body. The control method of a mobile terminal including a terminal main body includes: recognizing at least one of the presence or absence of a user and a location of the user within a certain range based on the main body; and generating a control signal for controlling a function of the terminal based on at least one of the presence or absence of the user and the location of the user.

In an embodiment, the recognizing at least one of the presence or absence of the user and the location of the user may include recognizing at least one of the presence or absence of the user and the location of the user by using at least one of a camera, a microphone, and an infrared sensor.

In an embodiment, the generating of the control signal may include: generating a control signal for controlling at least one of screen information displayed on a display unit and a volume of a voice output to an audio output unit.

In an embodiment, the generating of a control signal for controlling screen information displayed on the display unit may include: generating a control signal for controlling at least one of a size of contents, an interval between contents, and an alignment scheme of contents.

Further scope of applicability of the example embodiments of the present invention will become apparent from the detailed description given hereinafter. However, it should be understood that the detailed description and specific examples, while indicating preferred example embodiments of the invention, are given by illustration only, since various changes and modifications within the spirit and scope of the example embodiments of the present invention will become apparent to those skilled in the art from this detailed description.

BRIEF DESCRIPTION OF THE DRAWINGS

The example embodiments of the present invention will become more fully understood from the detailed description given hereinbelow and the accompanying drawings, which are given by illustration only, and thus are not limitative of the example embodiments of the present invention, and wherein.

DETAILED DESCRIPTION

Figure 1:
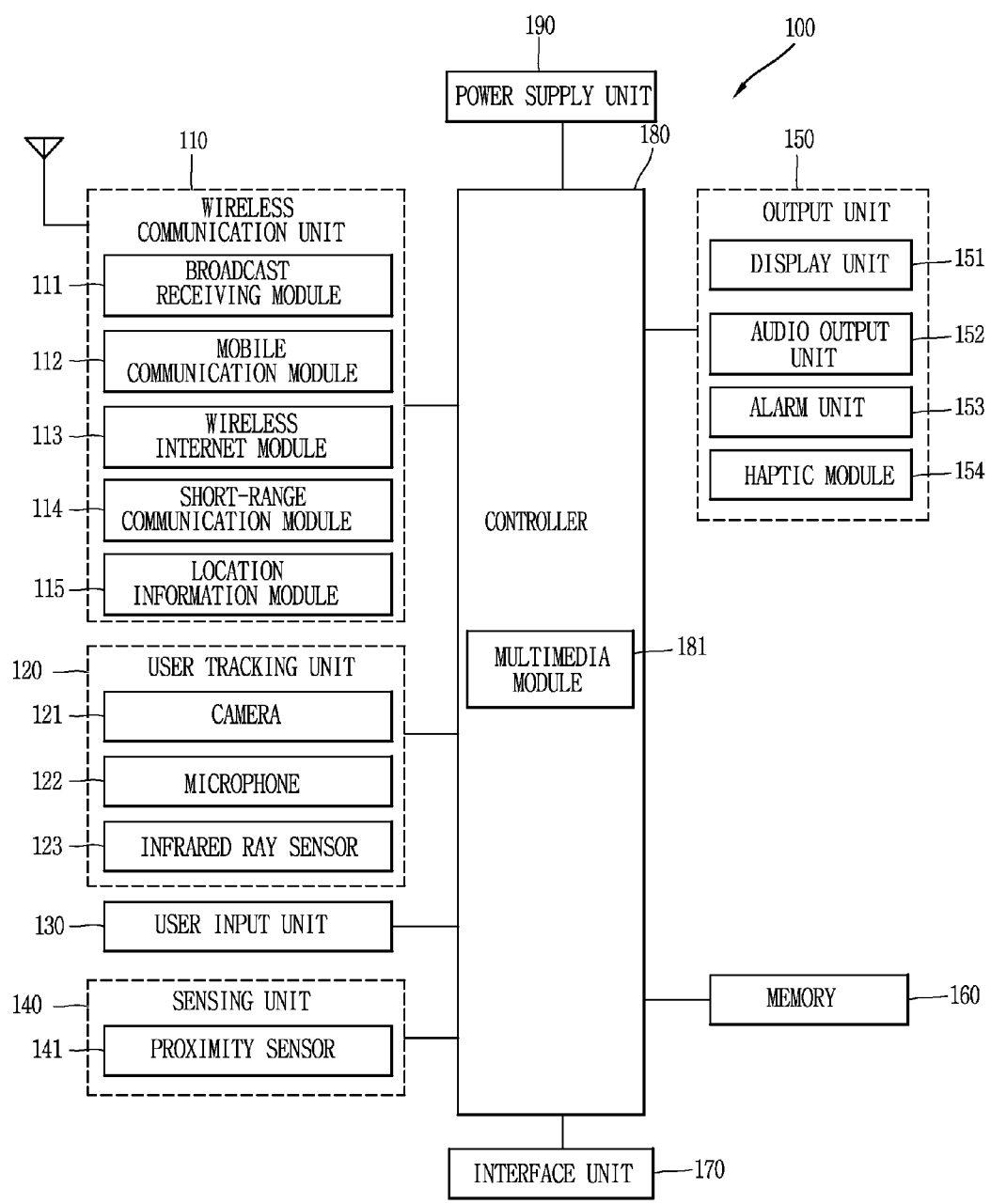
FIG. 1 is a block diagram of a mobile terminal according to an embodiment of the present invention.

Reference will now be made in detail to the preferred example embodiments of the present invention, examples of which are illustrated in the accompanying drawings.

Hereinafter, embodiments will be described in detail with reference to the accompanying drawings such that they can be easily practiced by those skilled in the art to which the example embodiments of the present invention pertain. In describing the example embodiments of the present invention, if a detailed explanation for a related known function or construction is considered to unnecessarily divert the gist of the example embodiments of the present invention, such explanation will be omitted but would be understood by those skilled in the art. In order to clarify the example embodiments of the present invention, parts irrespective of description will be omitted, and similar reference numerals are used for the similar parts throughout the specification.

The mobile terminal described in the example embodiments of the present invention may include mobile phones, smart phones, notebook computers, digital broadcast receivers, PDAs (Personal Digital Assistants), PMPs (Portable Multimedia Player), navigation devices, and the like. However, it would be understood by a person in the art that the configuration according to the example embodiments of the present invention can be also applicable to the fixed types of terminals, such as a digital TV, a desktop computer, and the like, except for any elements especially configured for a mobile purpose.

FIG. 1 is a block diagram of a mobile terminal 100 according to an embodiment of the present invention.

With reference to FIG. 1, the mobile terminal 100 includes a wireless communication unit 110, an A/V (Audio/Video) input unit (referred to as a 'user tracking unit', hereinafter) 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

Hereinafter, the elements 110 to 190 of the mobile terminal 100 will be described in detail as follows.

The wireless communication unit 110 typically includes one or more modules allowing for radio communication between the mobile terminal 100 and a wireless communication system or between the mobile terminal 100 and a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal, and a server. Such radio signals may include a voice call signal, a video call signal or various types of data according to text and/or multimedia message transmission and/or reception.

The wireless Internet module 113 supports wireless Internet access for the mobile terminal 100. This module may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile terminal 100. A typical example of the location information module is a GPS (Global Positioning System).

With reference to FIG. 1, the user tracking unit 120 is configured to receive an audio or video signal. The A/V input unit 120 may include a camera 121 and a microphone 122. The camera 121 processes image datan of still pictures or video obtained by an image capture device in a video capturing mode or an image capturing mode. The processed image frames may be displayed on a display unit 151. The image frames processed by the camera 121 may be stored in the memory 160 or transmitted to the outside via the wireless communication unit 110. Two or more cameras 121 may be provided according to a usage environment.

The microphone 122 may process an audio signal input from an external source into electrical voice data in a phone call mode, a recording mode, a voice recognition mode, and the like. The audio (voice) data processed by the microphone 122 may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. Also, the sensing unit 140 may include a touch sensor (not shown) for sensing a touch operation with respect to the display unit 151.

The touch sensor may have a form of a touch film, a touch sheet, a touch pad, and the like. The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

When the touch screen is an electrostatic type touch screen, an approach of the pointer is detected based on a change in an electric field according to the approach of the pointer. In this case, the touch screen (touch sensor) may be classified as a proximity sensor 141.

The proximity sensor 141 is a sensor for detecting the presence or absence of an object by using the force of electromagnetism or infrared rays without a physical contact. Thus, the proximity sensor 141 has a considerably longer life span compared with a contact type sensor, and it can be utilized for various purposes. Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like.

In the following description, for the sake of explanation, recognition of an object to be sensed positioned to be close to the touch screen will be called a 'proximity touch', while recognition of actual contacting of an object to be sensed on the touch screen will be called a 'contact touch'.

The proximity sensor 141 senses a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. A video signal or an audio signal may also be output through the display unit 151 or the audio output module 152, so the display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal datan of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a method of processing a user input with respect to the mobile terminal 100 will be described.

The user input units 130 is manipulated to receive a command for controlling the operation of the mobile terminal 100 and may include a plurality of manipulation units. The manipulation units may be generally referred to as a manipulating portion, and various methods and techniques can be employed for the manipulation portion so long as they can be operated by the user in a tactile manner.

Various types of visual information may be displayed on the display unit 151. The information may be displayed in the form of character, number, symbol, graphic, icon, etc. In order to input the information, at least one of the character, number, symbol, graphic and icon is displayed in a certain arrangement so as to be implemented in the form of a keypad. Such keypad may be so-called 'soft key'.

The display unit 151 may be operated as a whole region or may be divided into a plurality of regions and accordingly operated. In the latter case, the plurality of regions may be operation in association with each other. For example, an output window and an input window may be displayed at upper and lower portions of the display unit 151, respectively. The output window and the input window are regions allotted for outputting or inputting information, respectively. Soft keys including numbers for inputting a phone number, or the like, may be outputted to the input window. When the soft key is touched, a number corresponding to the touched soft key is displayed on the output window. When the manipulation unit is manipulated, a call connection with respect to a phone number displayed on the output window is attempted, or text displayed on the output window may be input to an application.

The display unit 151 or the touch pad may be configured to sense touch scrolling. The user may move a cursor or a pointer positioned on an entity, e.g., an icon or the like, displayed on the display unit 151 by scrolling the display unit 151 or the touch pad. In addition, when the user moves his fingers on the display unit 151 or the touch pad, a path along which the user's fingers move may be visually displayed on the display unit 151. This would be useful in editing an image displayed on the display unit 151.

One function of the terminal may be executed in case where the display unit 151 and the touch pad are touched together within a certain time range. The both touches may be clamping the terminal body with the user's thumb and index finger. The one function executed in this case may be, for example, activation or deactivation of the display unit 151 or the touch pad.

Figure 2A:
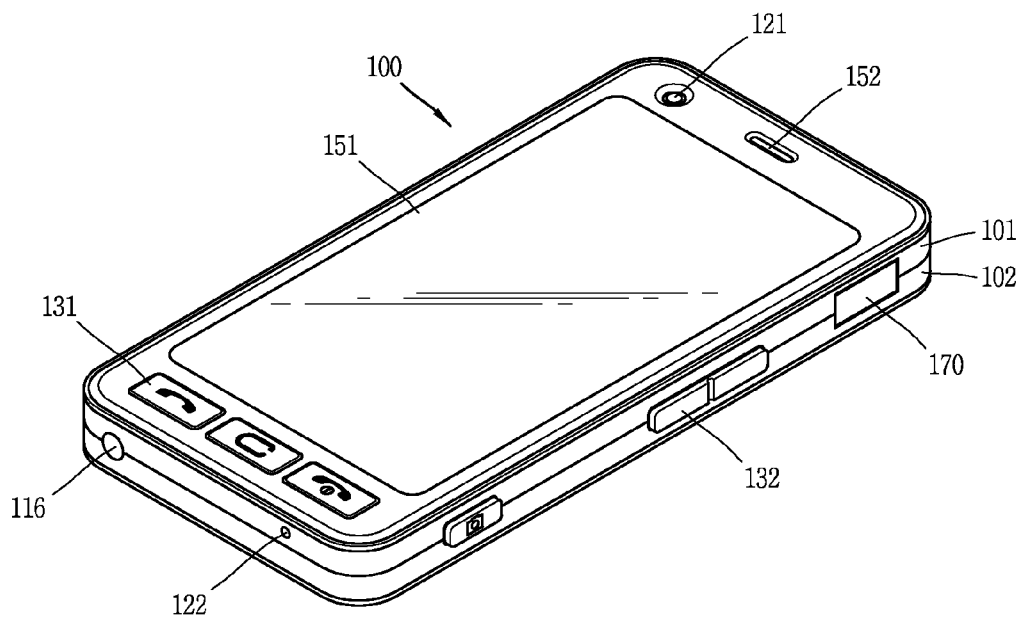
FIGS. 2A and 2B are perspective views showing an outer appearance of the mobile terminal according to an embodiment of the present invention.
Figure 2B:
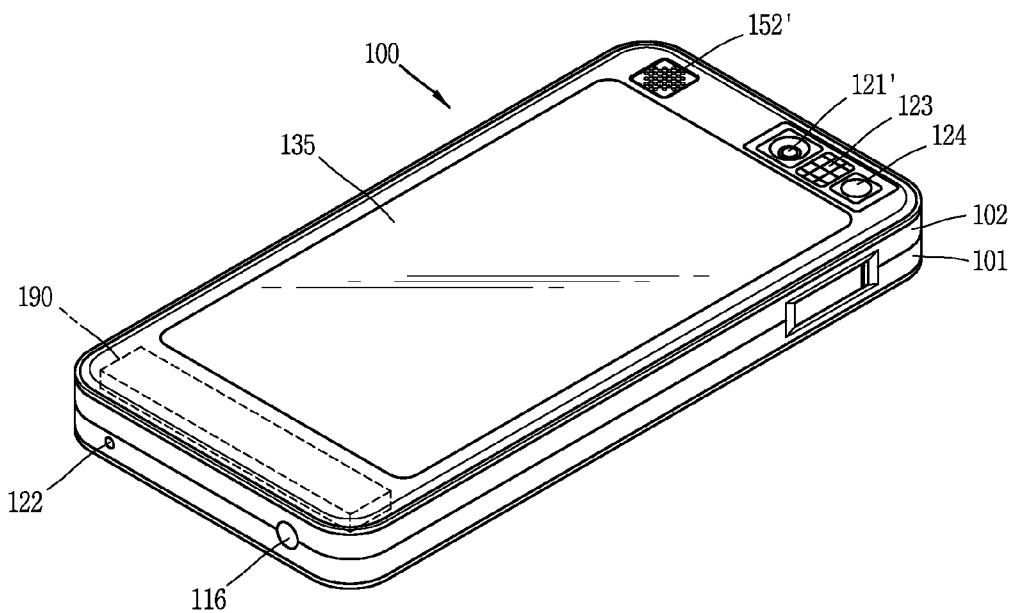

FIGS. 2A and 2B are perspective views showing an external appearance of the mobile terminal 100 according to an embodiment of the present invention.

Specifically, FIG. 2A shows a front surface and one lateral surface of the mobile terminal 100, and FIG. 2B shows a rear surface and another lateral surface of the mobile terminal 100.

With reference to FIG. 2A, the mobile terminal 100 has a bar type terminal body. However, without being limited thereto, the example embodiments of the present invention may also be applicable to a slide type mobile terminal, a folder type mobile terminal, a swing type mobile terminal, a swivel type mobile terminal, and the like, in which two or more bodies are coupled to be movable relatively.

The terminal body includes a case (or casing, housing, cover, etc.) constituting an external appearance of the terminal body. The case may be divided into a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, and the user input unit 130 (see FIG. 1), the microphone 122, the interface 170, and the like, may be located on the terminal body, namely, mainly, on the front case 101.

The display unit 151 occupies the most portion of the front surface of the front case 101. The audio output module 152 and the camera 121 are disposed at a region adjacent to one end portion of the display unit 151, and a first user input unit 131 and the microphone 122 are disposed at a region adjacent to the other end portion of the display unit 151. A second user input unit 132 and the interface 170 may be disposed on the sides of the front case 101 and the rear case 102.

The user input unit 130 is manipulated to receive commands for controlling the operation of the mobile terminal 100, and may include a plurality of manipulation units 131 and 132.

The manipulation units 131 and 132 may be generally called a manipulating portion, and they can employ any method so long as they can be manipulated in a tactile manner by the user.

The first or second manipulation unit 131 or 132 may receive various commands. For example, the first manipulation unit may receive commands such as start, end, scroll, or the like, and the second manipulation unit 132 may receive commands such as adjustment of size of a sound outputted from the audio output module 152, conversion to a touch recognition mode of the display unit 151, and the like.

With reference to FIG. 2B, a rear camera 121' may additionally be disposed on a rear surface of the terminal body, namely, on the rear case 102. The camera 121' may have an image capture direction which is substantially opposite to that of the camera 121 (See FIG. 2A), and may support a different number of pixels (i.e., have a different resolution) than the front camera 121.

For example, the front camera 121 may have a relatively small number of pixels, and the rear camera 121' may have a relatively large number of pixels. Thus, the use of the front camera 121 for a video call can reduce the size of transmission data in case of capturing the user's face and transmitting the captured image to a counterpart in real time. Meanwhile, the rear camera 121' may be used for the purpose of storing a high quality image.

Meanwhile, the cameras 121 and 121' may be installed on the terminal such that they are rotated or popped up.

A flash 123 and a mirror 124 may be additionally disposed adjacent to the camera 121'. When the user captures an image of the subject with the rear camera 121', the flash 123 illuminates the subject. The mirror 124 allows the user to see himself when he wants to capture his own image (i.e., self-image capturing) by using the rear camera 121'.

An audio output unit 152' may be additionally disposed on the rear surface of the terminal body. The rear audio output unit 152' may implement a stereoscopic function along with the audio output module 152 (See FIG. 2A), and may be used for implementing a speaker phone mode during call communication.

A broadcast signal receiving antenna 116 may be additionally disposed on the side of the terminal body in addition to an antenna that supports call communications. The antenna 116 forming a portion of the broadcast reception module 111 (See FIG. 1) may be installed to be drawn out of the terminal body.

A power supply unit 190 for supplying power to the mobile terminal 100 may be mounted on the terminal body. The power supply unit 190 may be installed in the terminal body or may be directly detached from the outside of the terminal body.

A touch pad 135 for detecting a touch may be additionally mounted on the rear case 102. Such touch pad may be configured to be light-transmissive like the display unit 151 (See FIG. 2A). Also, a rear display unit may be additionally mounted on the touch pad 135 in order to output visual information. In this case, information output from both of the front display unit 151 and the rear display unit may be controlled by the touch pad 135.

The touch pad 135 is operated in relation to the display unit 151. The touch pad 135 may be disposed to be parallel to the rear side of the display unit 151. The touch pad 135 may have the same size as or smaller than the display unit 151.

Meanwhile, the mobile terminal 100 may display contents on the display unit 151. However, when the user is located outside of a certain range based on the main body of the mobile terminal 100, the user may have difficulty in viewing the contents displayed on the display unit 151. Also, when a different user is located within the certain range based on the main body of the mobile terminal 100, the different user may be able to view contents displayed on the display unit 151, causing user inconvenience that user privacy is invaded.

Thus, hereinafter, the mobile terminal 100 capable of enhancing user convenience in displaying contents, and a control method thereof will be described with reference to the accompanying drawings.

Figure 3:
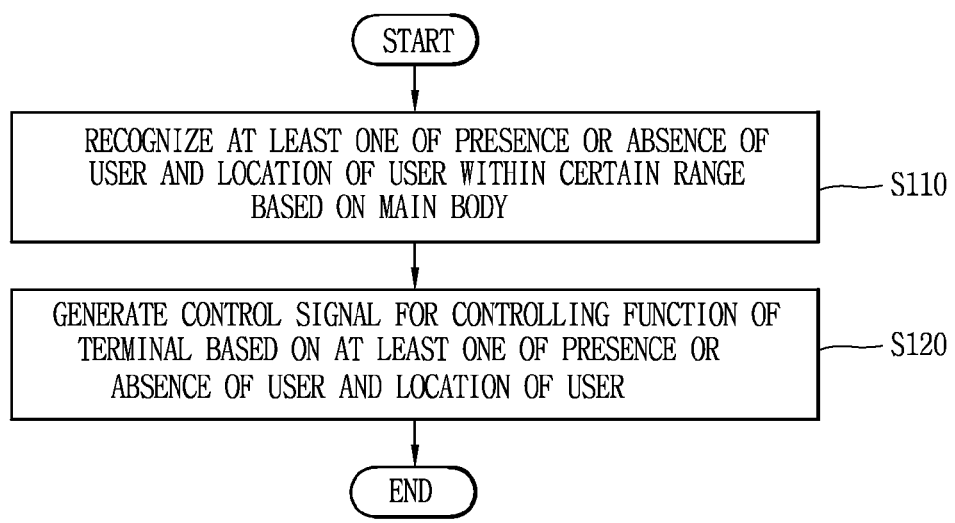
FIG. 3 is a flow chart illustrating an embodiment of the mobile terminal according to an embodiment of the present invention.

FIG. 3 is a flow chart illustrating an embodiment of the mobile terminal (See FIG. 1) according to an embodiment of the present invention. The mobile terminal 100 may include a main body, a user tracking unit 120 (See FIG. 1), and a controller 180 (See FIG. 1).

Referring to FIG. 3, first, a step (S110) of recognizing at least one of the presence or absence of a user and a location of the user within a certain range based on the main body is performed.

In detail, the user tracking unit 120 may recognize at least one of the presence or absence of the user and a location of the user by using at least one of the camera 121 (See FIG. 1), the microphone 122 (See FIG. 1), and an infrared sensor 123 (See FIG. 1).

One or more cameras 121 may be provided to obtain at least one of images, e.g., a still image and a video, of the user within a certain range based on the main body. In detail, the memory 160 (See FIG. 1) may store user information and a user image corresponding to the user information. Thereafter, when the camera 121 obtains a user image, the controller 180 may compare a user image previously stored in the memory 160 with the user image obtained by the camera 121 to extract user information corresponding to the obtained user image.

One or more microphones 122 may be provided to receive a user voice signal. In detail, the memory 160 may store user information and a user voice corresponding to the user information. Thereafter, when the microphone 122 receives the user voice, the controller 180 compares the received user voice with the user voice previously stored in the memory 160 to extract user information corresponding to the received user voice.

Thus, the controller 180 may recognize the presence or absence of a user by using the user information extracted from the memory 160. Meanwhile, the memory 160 may store information regarding a main user of the mobile terminal 100, and may store information regarding a different user rather than the main user. Also, the memory 160 may store information regarding user interfaces corresponding to the main user and different users, respectively.

Thereafter, when the presence of a user is recognized, the controller 180 may recognize a location of the user by using an image obtained from the camera 121. Although not shown, a location calculation unit for calculating the location of the user by using the obtained image may be provided.

Also, the controller 180 may recognize the location of the user by using an infrared sensor 123. One or more infrared sensors 123 may be provided to check the presence or absence of the user within a certain range based on the main body by using an infrared signal, and simultaneously recognize the location of the user.

Thereafter, step S120 of generating a control signal for controlling a function of the terminal based on at least one of the presence or absence of the user and the location of the user is performed.

In detail, the controller 180 may control screen information displayed on the display unit 151 (See FIG. 1) based on at least one of the presence or absence of the user and a location of the user.

The controller 180 may control at least one of a size of contents, an interval between contents, and an alignment scheme of contents displayed on the display unit 151 based on at least one of the presence or absence of the user and a location of the user. For example, when the user becomes away based on the main body, the controller 180 may increase the size of contents to display the contents on the display unit 151. Similarly, when the user becomes closer based on the main body, the controller 180 may reduces the size of the contents to display the contents on the display unit 151.

Also, the controller 180 may determine whether to activate the display unit 151 based on at least one of the presence or absence of the user and a location of the user. For example, when the user is not recognized or when the user is recognized to be located outside of the certain range based on the main body, the controller 180 may deactivate the display unit 151. Namely, the controller 180 may turn off the display unit 151. Thereafter, when an event occurs or when the user is recognized to be located within the certain range based on the main body, the controller 180 may activate the display unit 151 again.

Meanwhile, the controller may control a volume of a voice output to the audio output unit 152 (See FIG. 1) based on at least one of the presence or absence of the user and a location of the user. For example, when the user becomes away based on the main body, the controller 180 may turn up the volume of the voice. Similarly, when the user becomes closer based on the main body, the controller 180 may turn down the volume.

Also, when the user is not recognized by the user tracking unit 120 or when the user is recognized to be located outside of the certain range based on the main body, the controller 180 may deactivate the audio output unit 152. Namely, the controller 180 may turn off the audio output unit 152. Thereafter, when an event occurs or when the user is recognized to be located within the certain range based on the main body, the controller 180 may activate the audio output unit 152 again.

Also, when the user is not recognized by the user tracking unit 120 or when the user is recognized to be located outside of the certain range based on the main body, the controller 180 may deactivate the user tracking unit 120. Namely, the controller 180 may deactivate at least one of the camera 121, the microphone 122, and the infrared sensor 123. Thereafter, when an event occurs or when the user is recognized to be located within the certain range based on the main body, the controller 180 may activate the user tracking unit 120 again.

Meanwhile, when it is recognized by the user tracking unit 120 that the user is located to face a different side, rather than a front side, based on the display unit 151, the controller 180 may transmit a control signal for rotating the main body by a certain angle to an external device 300. Accordingly, the external device 300 may rotate the main body by a certain angle to direct the display unit towards the user.

Meanwhile, although not shown, the mobile terminal 100 may generate a control signal for controlling a function of the terminal based on a received voice signal. Namely, the mobile terminal 100 may be able to recognize a voice, and various operations of the mobile terminal 100 may be controller by voice commands.

As described above, according to an embodiment of the present invention, functions of the terminal may be controlled terminal based on at least one of the presence or absence of the user and a location of the user. Thus, when the user is located outside of a certain range based on the main body, contents displayed on the display unit 151 is automatically magnified to allow the user to easily view the contents from a remote distance.

Figure 4:
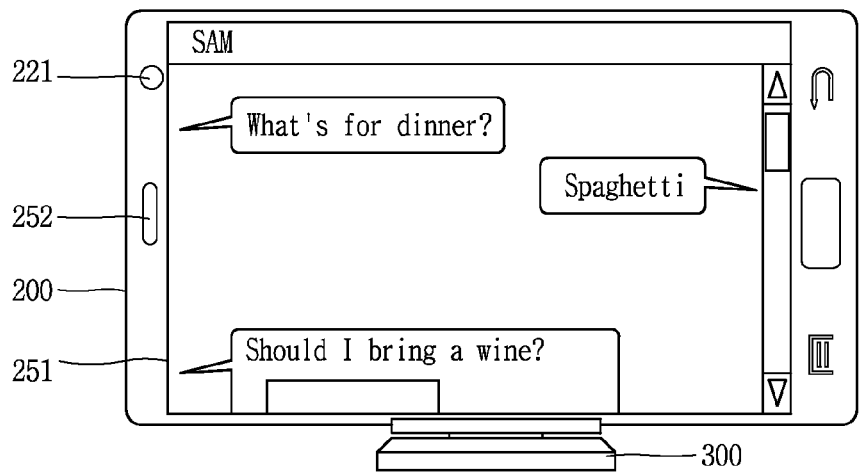
FIGS. 4 to 11 illustrate operational examples of the mobile terminal of FIG. 3.
Figure 4:
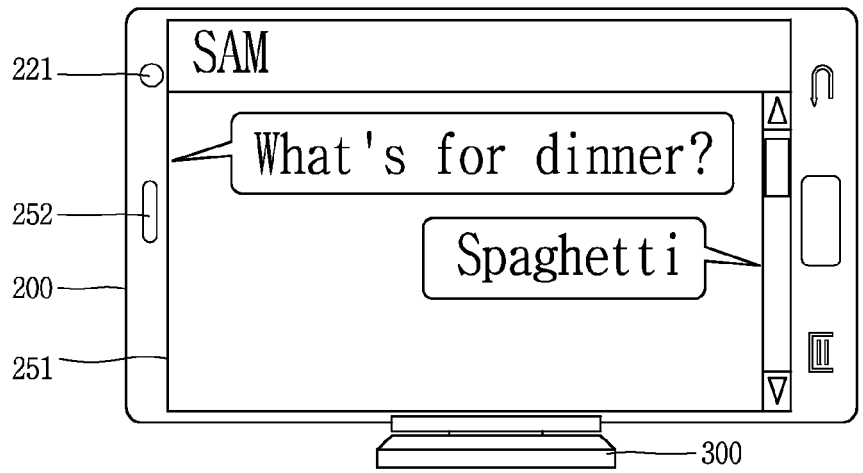

FIG. 4 is a conceptual view showing an operation example of a mobile terminal 200 of FIG. 3. The mobile terminal 200 may include the user tracking unit 120 (See FIG. 1), a camera 221, an audio output unit 252, a display unit 251, and the controller 180 (See FIG. 1). Here, the mobile terminal 200 may be coupled to the external device 300 in order to control a direction in which the display unit 251 faces.

Referring to FIG. 4, the user tracking unit 120 may obtain a user image. The controller 180 may recognize the presence or absence of the user 400 and a location of the user 400. Here, a location calculation unit for calculating a location of the user 400 through the obtained image may be used, or an infrared sensor 123 (See FIG. 1) for recognizing a location of the user 400 through infrared signals may also be used.

The memory 160 (See FIG. 1) may store information regarding user interfaces corresponding to locations of the user 400, respectively. The user interface information may include, for example, at least one of information items in relation to a size of contents, an interval between contents, and an alignment scheme of contents displayed on the display unit 251.

When the user 400, which was at a first location, is currently recognized to be at a location, e.g., a second location, distant based on the main body, the controller 180 may display second screen information on the display unit 251 based on user interface information corresponding to the second location.

Accordingly, as illustrated, when the user 400 becomes distant based on the main body, the display unit 251 may increase the size of contents to display the magnified (or scaled-up) contents. Although not shown, when the user becomes close based on the main body, the display unit 251 may reduce the size of the contents and display the reduced (or scaled-down) contents.

Meanwhile, the mobile terminal 200 may further include the microphone 122 (See FIG. 1) for receiving a voice signal from the user 400. The controller 180 may change the voice received through the microphone 122 into text (Speak To Text (STT)) and display the same on the display unit 251. For example, when the user 400 becomes distant based on the main body while speaking, the display unit 251 may gradually scale up text corresponding to the voice signal received from the user 400 and display the same thereon.

Although not shown, the controller 180 may control an interval between contents or an alignment scheme of contents displayed on a location of the user 400.

Figure 5A:
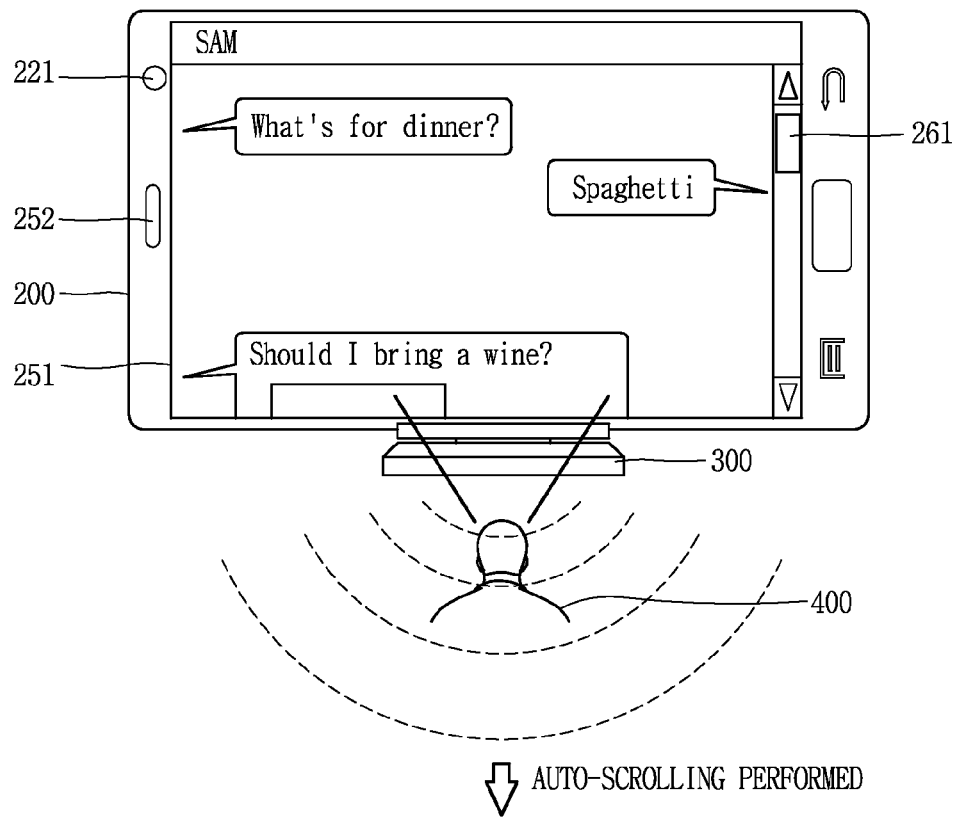
Figure 5A:
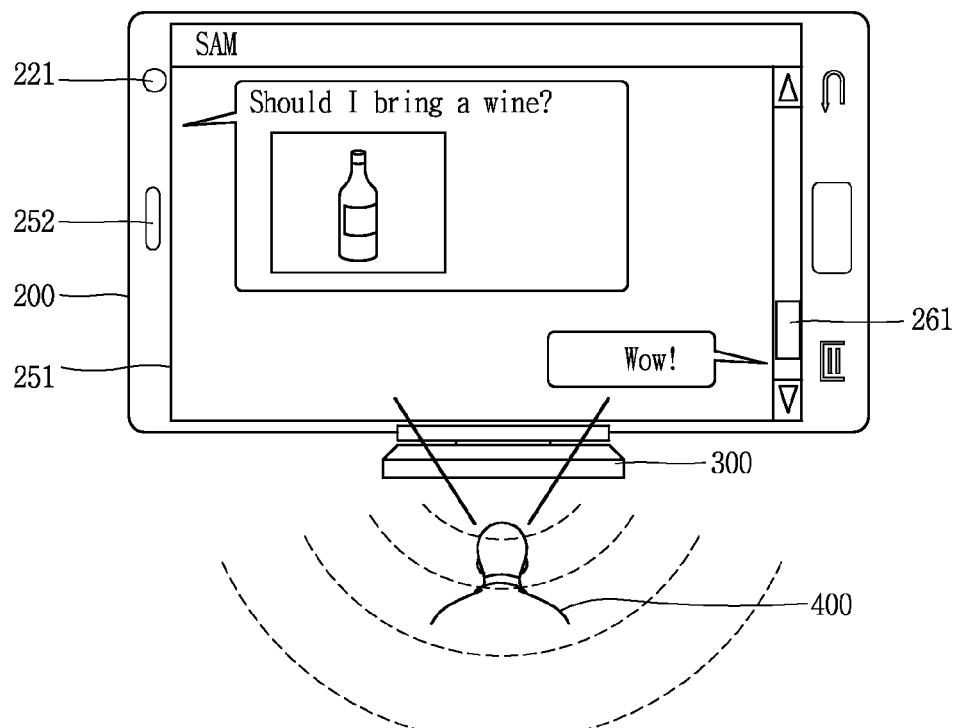
Figure 5B:
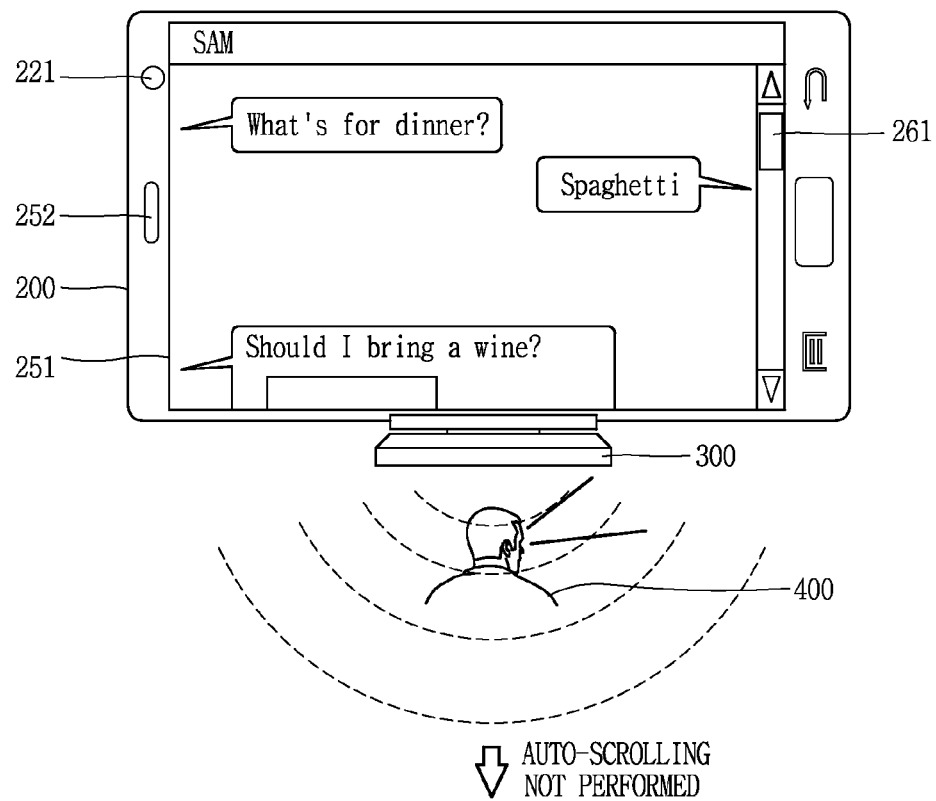
Figure 5B:
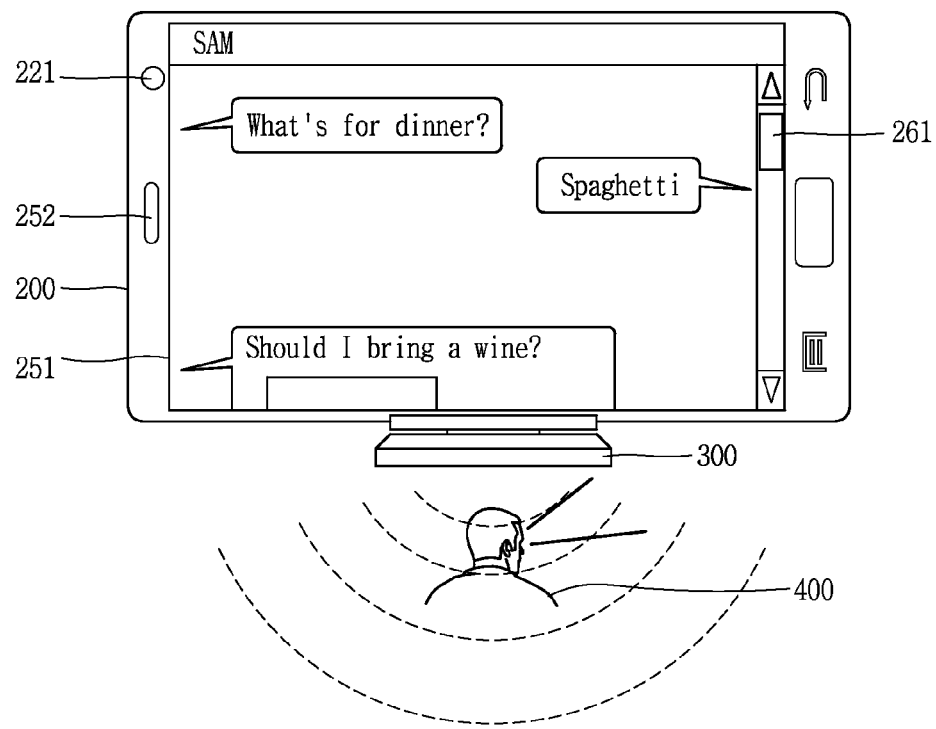

FIGS. 5A and 5B illustrate operational examples of the mobile terminal 200 of FIG. 3. The mobile terminal 200 may include the main body, the user tracking unit 120 (See FIG. 1), the camera 221, the audio output unit 252, the display unit 251, and the controller 180 (See FIG. 1).

Meanwhile, the user tracking unit 120 may include an eye searching unit. The eye searching unit may search the eye of the user 400 by using the camera 221 and the infrared sensor 123 (See FIG. 1). In detail, infrared rays emitted from the infrared sensor 123 may be reflected from the retina of the eyes of the user 400 within a certain viewing range based on the display unit 251. The reflected infrared rays may be input to the eye searching unit. Thereafter, the eye searching unit may search a visual field of the user 400 by using the received infrared rays and the user image obtained by the camera 221.

As illustrated in FIG. 5A, when it is recognized by the eye searching unit that the user 400 is viewing the display unit 251, the controller 180 may auto-scroll screen information displayed on the display unit 251.

Accordingly, when the visual field of the user 400 is fixed to the display unit 251, a scroll bar 261 may automatically move without a user's control command to automatically convert screen information displayed on the display unit 251. Here, a speed of auto-scrolling may be adjusted according to pre-set information, or may also be adjusted according to a movement of the user or a voice command.

Meanwhile, as illustrated in FIG. 5B, when it is recognized by the eye searching unit that the user 400 is not viewing the display unit 251, screen information displayed on the display unit 251 may not be automatically converted. However, even in this case, the controller 180 may auto-scroll screen information displayed on the display unit 251 according to a movement of the user or a voice command of the user.

Figure 6A:
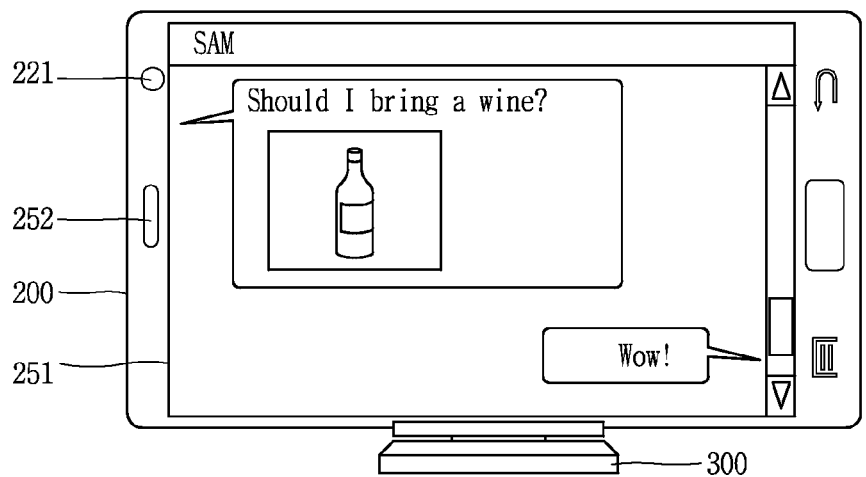
Figure 6A:
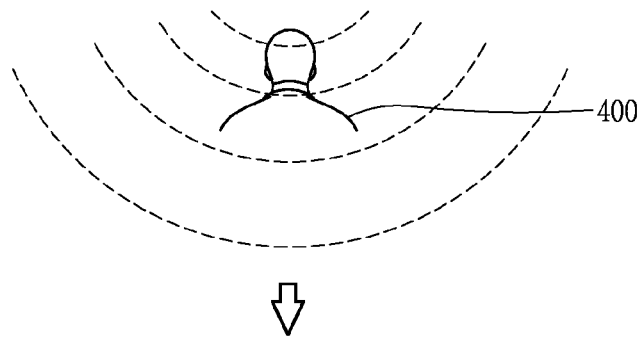
Figure 6A:
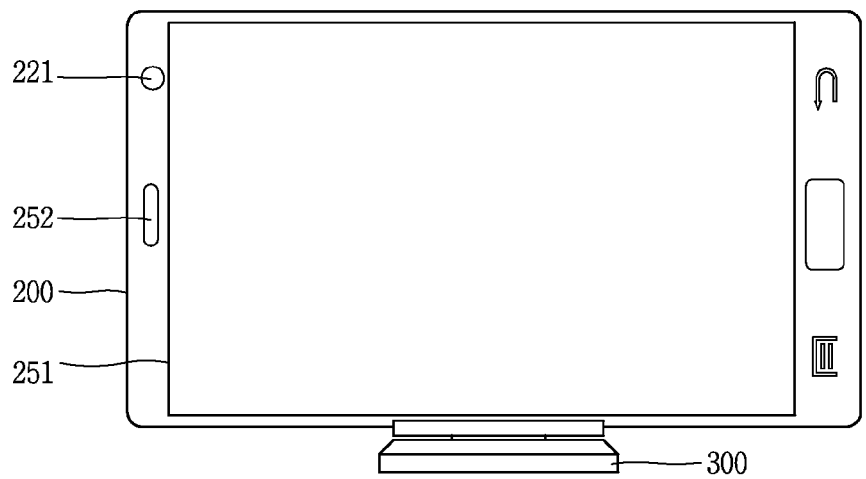
Figure 6A:
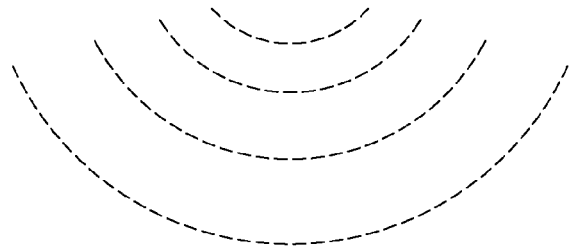
Figure 6B:
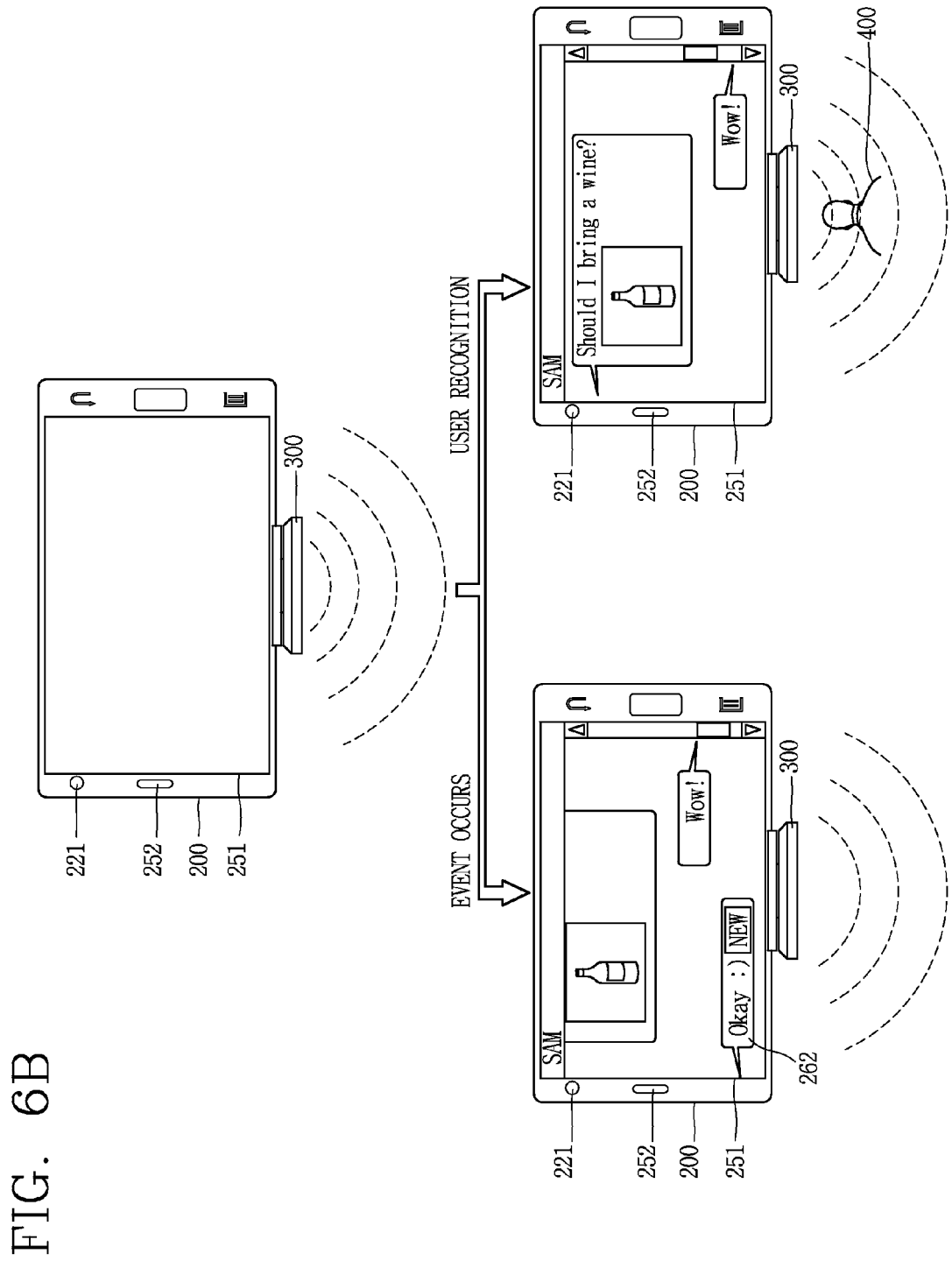

FIGS. 6A and 6B illustrate operational examples of the mobile terminal 200 of FIG. 3. The mobile terminal 200 may include the main body, the user tracking unit 120 (See FIG. 1), the camera 221, the audio output unit 252, the display unit 251, and the controller 180 (See FIG. 1).

As illustrated in FIG. 6A, the controller 180 may determine whether to activate the display unit 251 based on at least one of the presence or absence of the user 400 and the location of the user 400. In detail, when the user 400 is not recognized by the user tracking unit 120, the controller 180 may deactivate the display unit 251. Namely, the controller 180 may turn off the display unit 251. Meanwhile, although not shown, even when the user tracking unit 120 recognizes that the user 400 is located outside of a certain range based on the main body, the controller 180 may deactivate the display unit 251.

Although not shown, when the user 400 is not recognized by the user tracking unit 120 or when the user 400 is recognized to be located outside of the certain range based on the main body, the controller 180 may adjust brightness of the display unit 251 in order to wave power resource in a state in which the display unit 251 is in an ON state, or may display different screen information, e.g., a substitute image, on the display unit 251.

Thereafter, as illustrated in FIG. 6B, when an event occurs in a state in which the user 400 is not recognized, for example, when a new text message 262 is received, the controller 180 may activate the display unit 151 again to display the new text message 262 on the display unit 251. Also, when the user 400 is recognized to be located within the certain range based on the main body, the controller 180 may activate the display unit 251 again.

Similarly, when an event occurs in a state in which the user 400 is not recognized or when the user is recognized to be located within the certain range based on the main body, the controller 180 may restore brightness of the display unit 251 and screen information displayed on the display unit 251.

Figure 7:
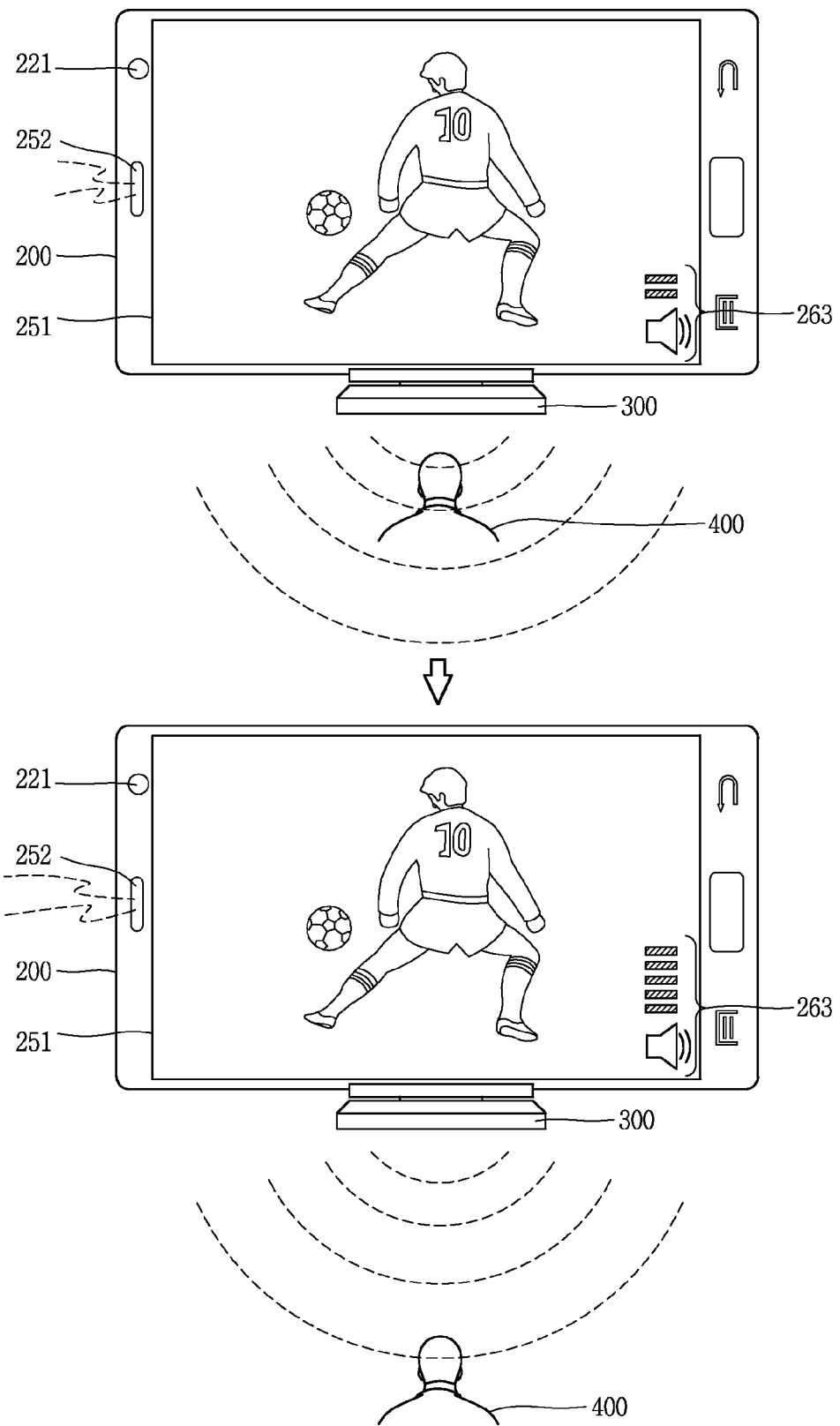

FIG. 7 illustrates operational examples of the mobile terminal 200 of FIG. 3. The mobile terminal 200 may include the main body, the user tracking unit 120 (See FIG. 1), the camera 221, the audio output unit 252, the display unit 251, and the controller 180 (See FIG. 1).

Referring to FIG. 7, the controller 180 may control a volume of a voice signal output to the audio output unit 252 based on at least one of the presence or absence of the user 400 and the location of the user 400.

In detail, when the user 400, who was at a first location, is currently recognized to be at a location, e.g., a second location, distant or away based on the main body, the controller 180 may control a volume of the audio output unit 252 based on volume level information corresponding to the second location. Meanwhile, the controller 180 may control a volume of the audio output unit 252 based on volume level information corresponding to a difference between the first location and the second location. Here, as illustrated, the controller 180 may display an icon 263 corresponding to the volume level on the display unit 251.

Although not shown, when the user 400 becomes close based on the main body, the controller 180 may adjust a volume of the audio output unit 252 based on the volume level information corresponding to the closer location or the volume level information corresponding to the difference between the two locations. Also, in this case, the controller 180 may display the icon 263 corresponding to the volume level on the display unit 251.

Accordingly, when the user 400 becomes distant based on the main body, the controller 180 may turn up the volume of the voice signal. Similarly, when the user 400 becomes close based on the main body, the controller 180 may turn down the voice signal.

Meanwhile, although not shown, when the user 400 is not recognized by the user tracking unit 120 or when the user 400 is recognized to be located outside of the certain range based on the main body, the controller 180 may deactivate the audio output unit 252. Namely, the controller 180 may turn off the audio output unit 252. Thereafter, when an event occurs or when the user 400 is recognized to be located within the certain range based on the main body, the controller 180 may activate the audio output unit 252 again.

Figure 8:
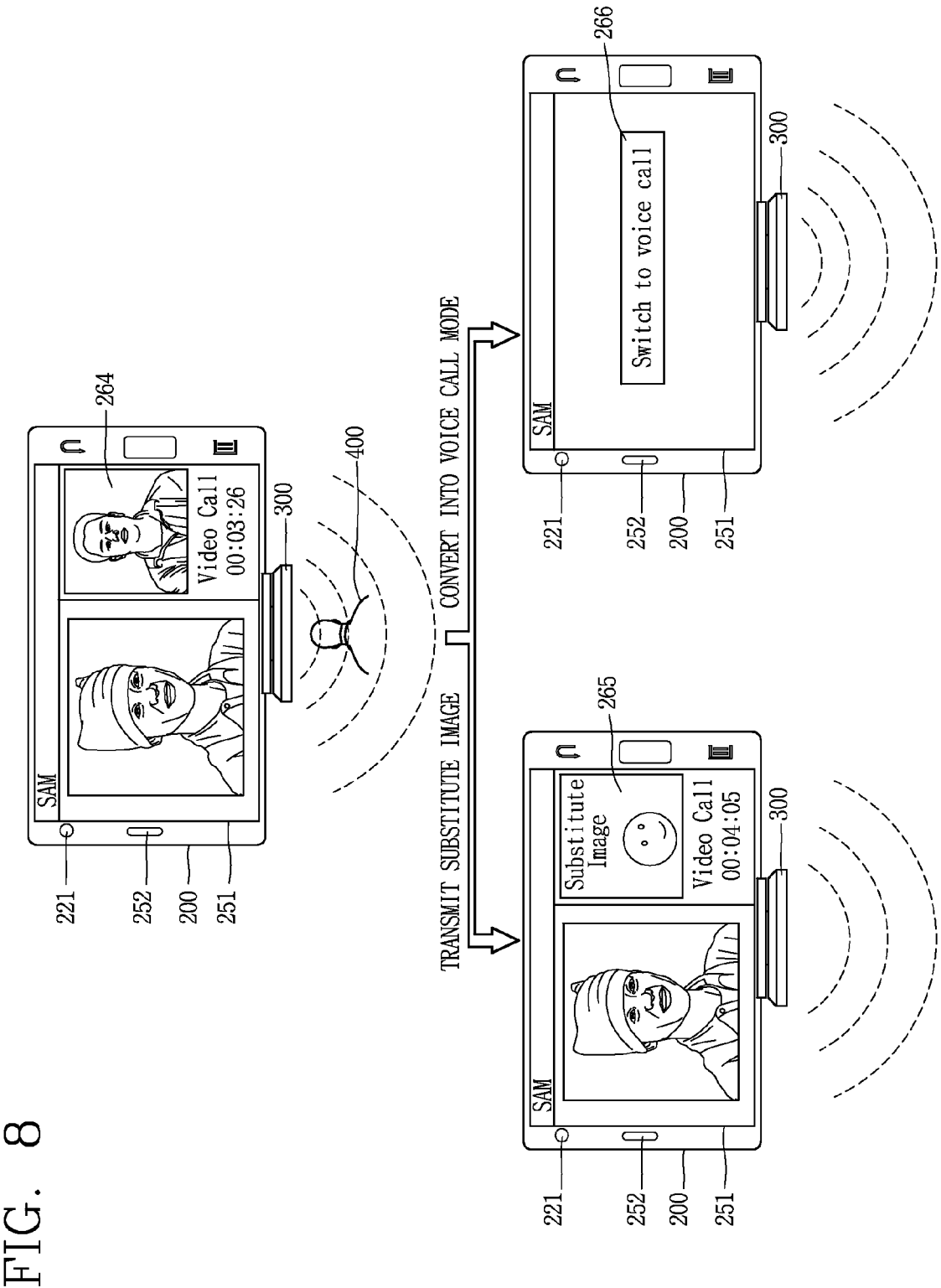

FIG. 8 illustrates operational examples of the mobile terminal 200 of FIG. 3. The mobile terminal 200 may include the main body, the user tracking unit 120 (See FIG. 1), the camera 221, the audio output unit 252, the display unit 251, and the controller 180 (See FIG. 1).

Referring to FIG. 8, the controller 180 may select any one of a video call mode and a voice call mode based on at least one of the presence or absence of the user 400 and a location of the user 400.

In detail, when the user 400 is not recognized during a video call or when the user 400 is recognized to be located outside of a certain range based on the main body, the controller 180 may transmit a substitute image 265 to a counterpart.

Here, the substitute image 265 may be a previously designated image or may be an image in relation to a social network service. Also, although not shown, the substitute image 265 may be an image obtained from a different camera mounted in the opposite side of the camera 221 used for the video call.

Also, when the user 400 is not recognized during the video call or when the user 400 is recognized to be located outside of the certain range based on the main body, the controller 180 may convert the video call mode into a voice call mode. Here, as illustrated, a pop-up window 266 informing about the conversion into the voice call mode may be displayed on the display unit 251. Also, the wireless communication unit 110 (See FIG. 1) may transmit a message informing about the conversion into the voice call mode to a mobile terminal of the counterpart.

Thereafter, although not shown, when the user is recognized to be located within the certain range based on the main body, the controller 180 may transmit a video of the user 400 to the counterpart again. Similarly, the controller 180 may convert the voice call mode into the video call mode.

Meanwhile, when it is recognized by the user tracking unit 120 that the user 400 is located to face a different side, rather than a front side, based on the camera 221 or the display unit 151, the controller 180 may transmit a control signal for rotating the main body by a certain angle to an external device 300. Accordingly, the external device 300 may rotate the main body by a certain angle to direct camera 221 or the display unit towards the user.

Although not shown, the controller 180 may select any one of an image signal output mode and a voice signal output mode based on the location of the user 400. Also, the controller 180 may determine whether to display subtitles on the display unit 251 during an image signal output or determine whether to record output image signals based on the location of the user 400.

Figure 9A:
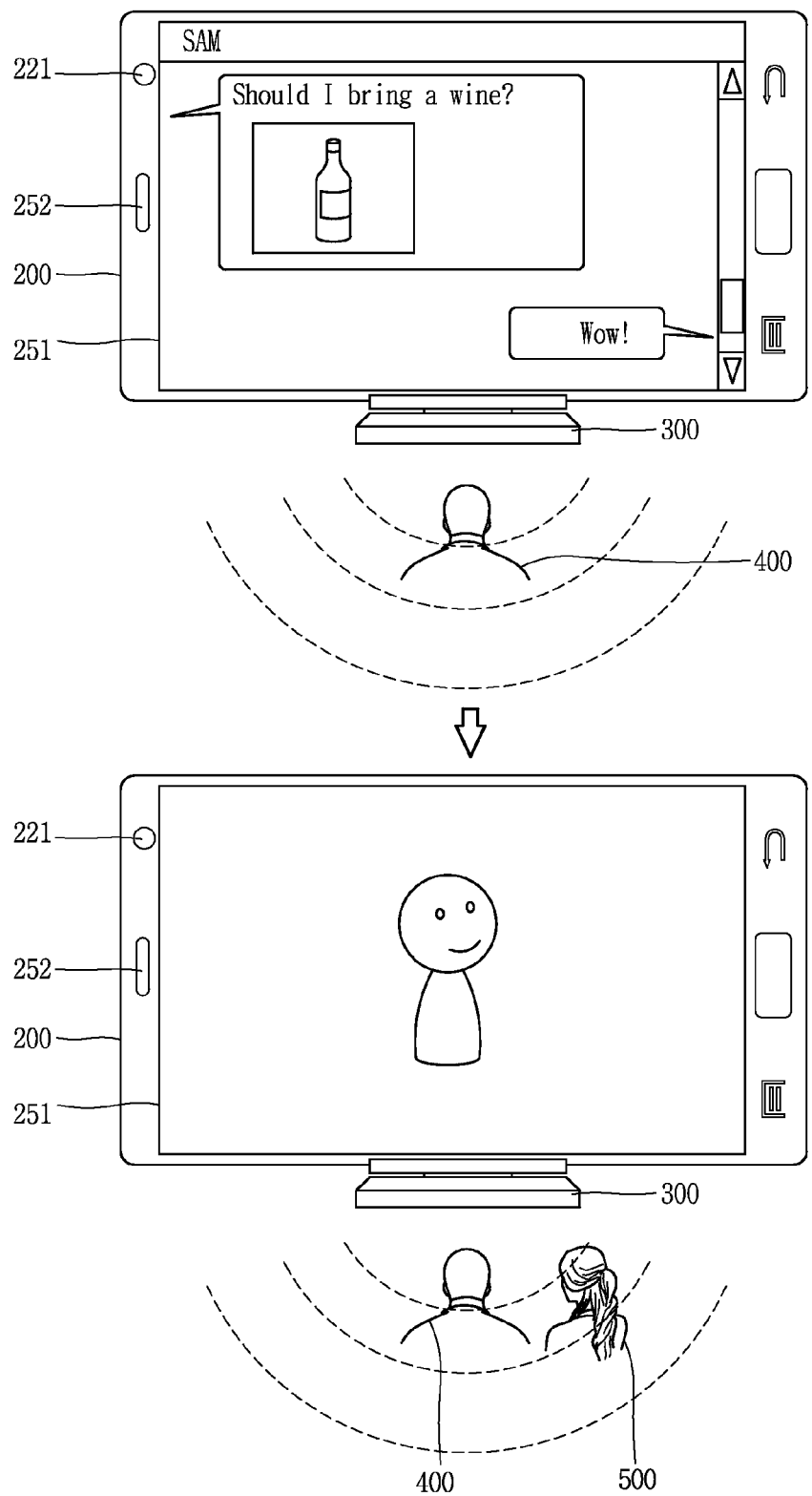
Figure 9B:
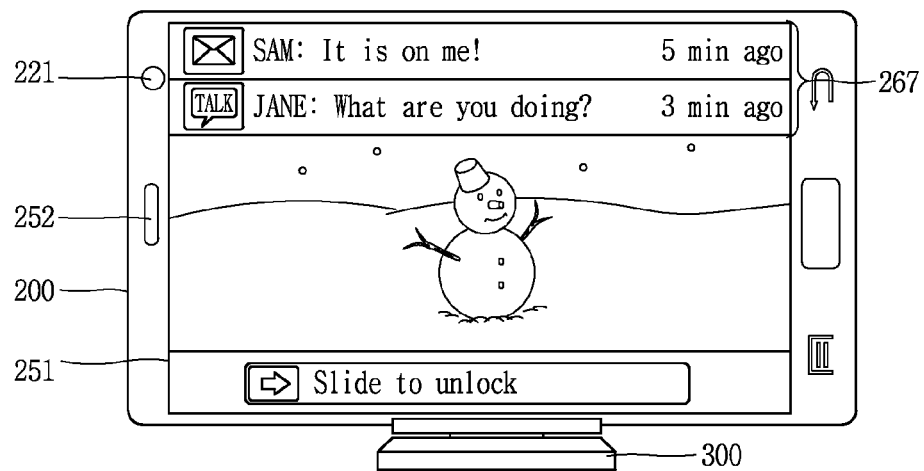
Figure 9B:
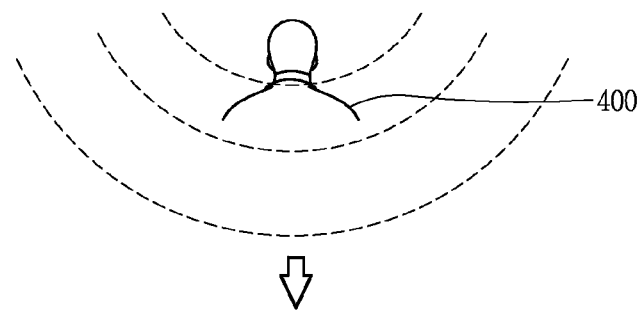
Figure 9B:
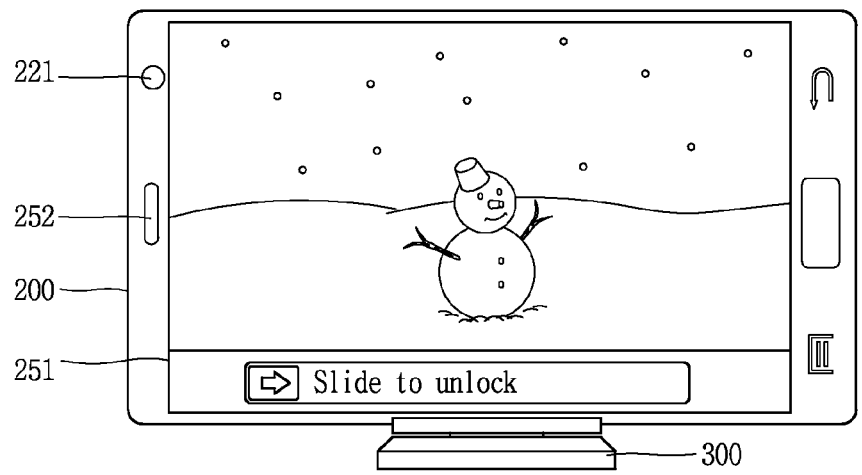
Figure 9B:
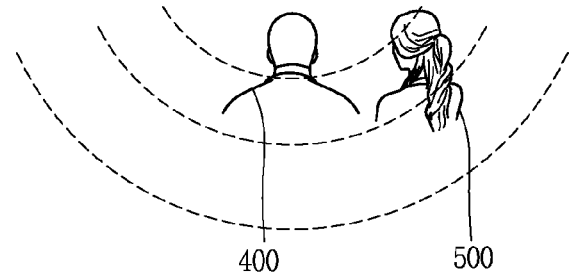

FIGS. 9A and 9B illustrate operational examples of the mobile terminal 200 of FIG. 3. The mobile terminal 200 may include the main body, the user tracking unit 120 (See FIG. 1), the camera 221, the audio output unit 252, the display unit 251, and the controller 180 (See FIG. 1).

When a different user 500 is recognized by the user tracking unit 120 in a state in which screen information is displayed on the display unit 251, the controller 180 may display different screen information, e.g., a substitute image, on the display unit 251.

In detail, the memory 160 (See FIG. 1) may store information regarding a main user of the mobile terminal 100 and corresponding main user images. Also, the memory 160 may store information regarding a different user, rather than the main user, and corresponding different user images.

The user information may include, for example, a control command for controlling such that transmitted and received text messages are seen when a different user included in a first group among different users is recognized, and transmitted and received text messages are not seen when a different user included in a second group among the different users.

The user tracking unit 120 may obtain a user image. The controller 180 may compare a user image previously stored in the memory unit 160 and a user image obtained from the camera 221 to extract user information corresponding to the obtained user image.

As illustrated in FIG. 9A, in a state in which transmitted and received text messages are displayed on the display unit 251, when the user tracking unit 120 obtains an image of a different user 500, the controller 180 may extract information regarding the different user 500. Here, when the different user 500 is included in the second group, the controller 180 may convert a menu being executed into a different menu and may display a substitute image on the display unit 251.

Similarly, as illustrated in FIG. 9B, in a state in which a locked screen together with unidentified text messages is displayed on the display unit 251, when the user tracking unit 120 obtains an image of the different user 500 included in the second group, the controller 180 may make the text messages displayed on the display unit 251 disappear.

Here, although not shown, the controller 180 may control the display unit 251 to display a different amount of screen information. Namely, the controller 180 may make a portion of the text messages displayed on the display unit 251 disappear.

Meanwhile, a location of the different user 500 may be recognized by using an image obtained by the user tracking unit 120. The controller 180 may display different screen information on the display unit 251 based on the location of the different user 500, in addition to the information regarding the user 500 previously stored in the memory 160.

Thereafter, although not shown, when the different user 500 is not recognized by the user tracking unit 120 or when the different user 500 is recognized to be located outside of the certain range based on the main body, the controller 180 may restore screen information displayed on the display unit 251.

As described above, according to an embodiment of the present invention, when the different user 500 is located within the certain range based on the main body of the terminal, contents displayed on the display unit 251 is changed to different contents, thereby protecting privacy of the user 400. As a result, convenience of the user 400 can be enhanced.

Figure 10A:
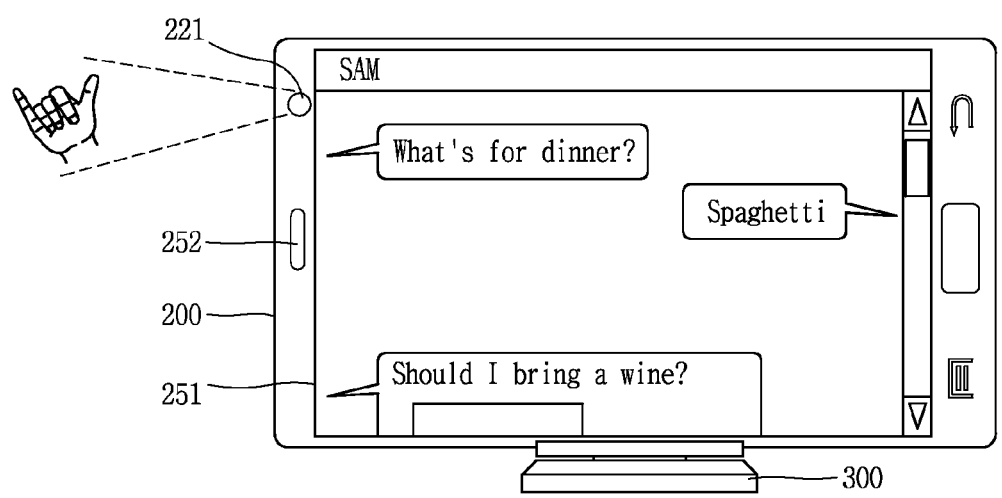
Figure 10A:
Figure 10A:
Figure 10B:
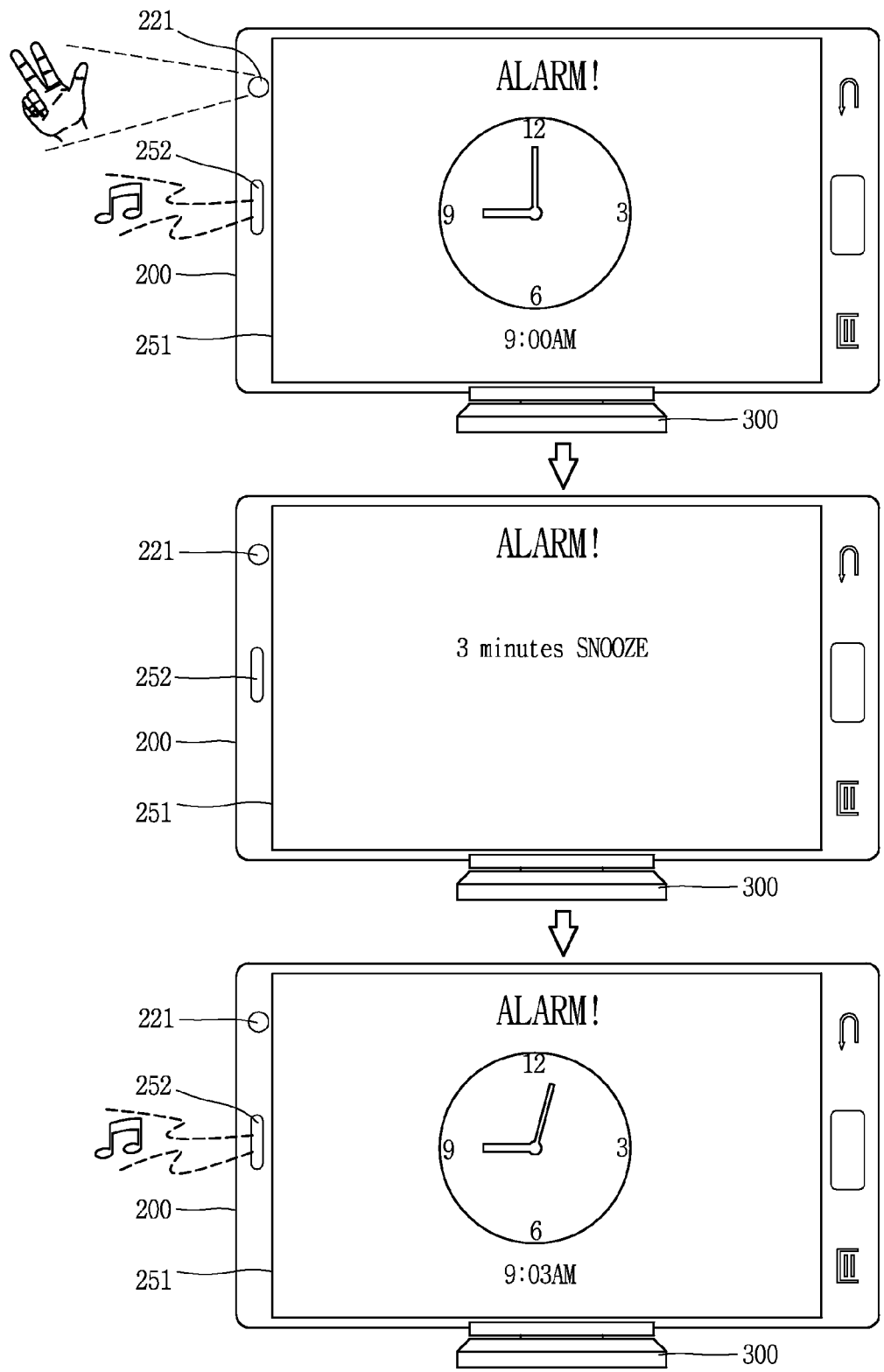

FIGS. 10A and 10B illustrate operational examples of the mobile terminal 200 of FIG. 3. The mobile terminal 200 may include the main body, the user tracking unit 120 (See FIG. 1), the camera 221, the audio output unit 252, the display unit 251, and the controller 180 (See FIG. 1).

When a movement of the user 400 is sensed by the user tracking unit 120, the controller 180 may generate a control signal for controlling a function of the terminal based on the sensed movement.

In detail, the memory 160 (See FIG. 1) may store a control command corresponding to each of movements of the user 400. Thereafter, when a movement of the user 400 is sensed by the user tracking unit 120, the controller 180 may extract a control command corresponding to the sensed movement from the memory 160.

As illustrated in FIG. 10A, in a state in which transmitted and received text messages are displayed on the display unit 251, when the user tracking unit 120 senses a movement of the user 400, e.g., a gesture corresponding to a call signal transmission function, the controller 180 may transmit a call signal to a counterpart that has transmitted and receive the displayed text messages. Here, an icon in relation to the transmission of the call signal may be displayed on the display unit 251.

Also, as illustrated in FIG. 10B, in a state in which an alarm is sounding, when the user tracking unit 120 senses a movement of the user 400, e.g., a gesture corresponding to a snooze function that alarm is sounded in three minutes, the controller 180 may sound alarm after three minutes. Here, an icon in relation to the snooze function may be displayed on the display unit 251.

Meanwhile, although not shown, when a particular movement of the user 400 is sensed by the user tracking unit 120, for example, when a movement of the user that he wakes up is sensed by the user tracking unit 120, the controller 180 may turn off alarm. Here, pre-set contents, e.g., contents such as weather, news, or the like, may be displayed on the display unit 251. Thereafter, when the user tracking unit 120 senses that the user does not move during a pre-set period of time, the controller 180 may perform controlling to sound alarm again.

Accordingly, the controller 180 may perform a call signal transmission and reception, alarm snooze, a camera timer, a change of DMB channel, and a volume adjustment function according to a control command corresponding to a sensed gesture of the user. Also, the controller 180 may generate an emoticon corresponding to the sensed gesture and transmit the same to a counterpart.

Meanwhile, although not shown, the mobile terminal 200 may further include the microphone 122 (See FIG. 1) for receiving a voice signal of the user 400. The controller 180 may generate a control signal for controlling a function of the terminal based on the voice signal received by the microphone 122. Here, the memory 160 may store a control command corresponding to each voice signal.

For example, in a state in which transmitted and received text messages are displayed on the display unit 251, when the microphone 122 receives a voice signal, e.g., a shout of "Call!", corresponding to a call signal transmission function of the user 400, the controller 180 may transmit a call signal to a counterpart that have transmitted and received the displayed text messages.

Figure 11:
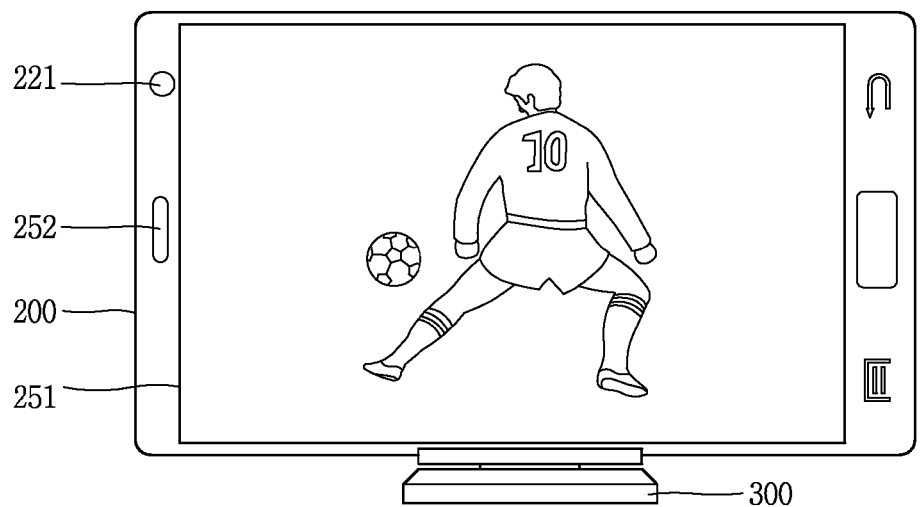
Figure 11:
Figure 11:
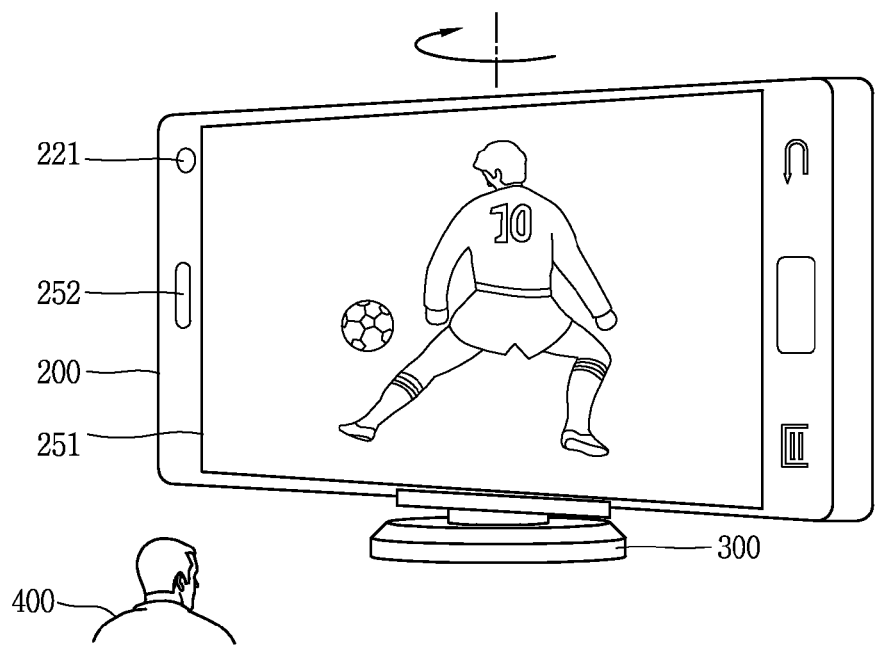

FIG. 11 illustrates operational examples of the mobile terminal 200 of FIG. 3. The mobile terminal 200 may include the main body, the user tracking unit 120 (See FIG. 1), the camera 221, the audio output unit 252, the display unit 251, and the controller 180 (See FIG. 1). Here, the mobile terminal 200 may be coupled to the external device 300 to control the direction in which the display unit 251 faces. The external device 300 may have a motor for rotating the main body by a certain angle.

Referring to FIG. 11, the controller 180 may transmit a control signal according to a location of the user 400 to the external device 300 adjacent to the main body in order to control the direction in which the display unit 251 faces.

In detail, when the user tracking unit 120 recognizes that the user 400 faces a different side, rather than a front side, based on the display unit 251, the controller 180 may transmit a control signal for rotating the main body by a certain angle to the external device 300. Accordingly, the external device 300 may rotate the main body by the certain angle to direct the display unit 251 toward the user 400.

Meanwhile, in order to control a direction in which the camera 221 faces, the controller 180 may transmit a control signal according to a location of the user to the external device 300 adjacent to the main body. Here, the user may include a plurality of different users, in addition to the main user 400.

When a control command in relation to obtaining an image is received, for example, when a smiling face is recognized, when a laughing voice is sensed, or when a designated command is received, the controller 180 may obtain an image of a plurality of users by using the camera 221.

Thereafter, the controller 180 may tag information regarding each of the plurality of users, e.g., a name, a contact number, a keyword, and the like, to the obtained image by using information in relation to each of the plurality of users previously stored in the memory 160 (See FIG. 1). The controller 180 may generate a folder in relation to each of the plurality of users tagged to the image. Also, the controller 180 may transmit the image to each of the plurality of users or may upload the image to a social network service server.

In the embodiments of the present invention, the foregoing method can be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a memory configured to store information, the information comprising first information associated with a first user of the mobile terminal and at least one image including a first user image corresponding to the first user;
a display configured to display screen information;
a camera configured to obtain a user image; and
a controller configured to:
recognize a user based on the obtained user image and the stored information;
control a function of the terminal based on the recognized user;

cause the display to display first screen information according to the first information; and cause the display to display second screen information that is different from the first screen information when a second user is recognized while the first screen information is displayed.

2. The mobile terminal of claim 1, wherein the controller is further configured to recognize the user based on information obtained by at least a microphone or an infrared sensor.

3. The mobile terminal of claim 2, wherein:

the first screen information comprises a text message; and
the second screen information comprises a portion of the text message.

4. The mobile terminal of claim 1, wherein the second screen information is a substitute image not related to the first screen information.

5. The mobile terminal of claim 1, wherein the controller is further configured to convert a first menu into a second menu when the second user is recognized.

6. The mobile terminal of claim 1, wherein the controller is further configured to activate the display when the user is recognized.

7. The mobile terminal of claim 6, wherein:

the user is recognized when the user is positioned within a certain range from the terminal;
the controller is further configured to deactivate the display when the user is positioned outside the certain range; and
the controller is further configured to re-activate the display when an event is recognized or when the user is re-recognized to be located within the certain range.

8. The mobile terminal of claim 2, wherein the controller is further configured to cause the memory to store information associated with a different user and an image corresponding to the different user.

9. The mobile terminal of claim 8, wherein:

the controller is further configured to select a video call mode or a voice call mode based on recognition of the user; and
when the user is not recognized during video call communication or when the user is recognized to be outside of the certain range in the video call mode, the controller is further configured to cause transmission of a substitute image, instead of the user image, to a counterpart or to convert the video call mode to the voice call mode.

10. The mobile terminal of claim 1, wherein the controller is further configured to cause the display to redisplay the first screen information when the second user is no longer recognized by the user tracking unit.

11. The mobile terminal of claim 1, wherein the controller is further configured to determine the second screen information based on second information associated with the second user stored in the memory.

12. The mobile terminal of claim 1, wherein the controller is further configured to control the function based on movement of the recognized user.

13. The mobile terminal of claim 1, further comprising:

a microphone configured to receive a voice signal,
wherein the controller is further configured to control the function based on the received voice signal.

14. The mobile terminal of claim 1, wherein:

the mobile terminal is configured to be coupled to an external device; and
the controller is further configured to cause the external device coupled to the mobile terminal to move based on a location of the recognized user such that the display is directed toward the location of the recognized user.

15. The mobile terminal of claim 1, wherein the controller is further configured to:

recognize the user by comparing the obtained user image with the at least one image stored in the memory; and
retrieve information associated with the user from the memory based on the recognized user.

16. A control method of a mobile terminal comprising a display configured to display screen information and a memory configured to store information, the method comprising:

storing first information associated with a first user and at least one image including a first user image corresponding to the first user;
obtaining a user image via a camera to recognize a user based on the obtained user image and the stored information;
controlling a function of the terminal based on the recognized user;
displaying first screen information according to the first information; and
displaying second screen information that is different from the first screen information when a second user is recognized while the first screen information is displayed.

17. The control method of claim 16, further comprising:
recognizing the user based on additional information obtained via at least a microphone or an infrared sensor.

18. The control method of claim 16, further comprising:
recognizing a voice signal; and
controlling the function based on the recognized voice signal.

19. The control method of claim 16, wherein the second screen information is a substitute image not related to the first screen information.

* * * * *